United States Patent
Wu et al.

(10) Patent No.: US 9,986,473 B2
(45) Date of Patent: May 29, 2018

(54) USER EQUIPMENT PANIC STATE(S) UNDER CONNECTED MODE DISCONTINUOUS RECEPTION STATE IN LONG TERM EVOLUTION

(71) Applicant: QUALCOMM Incorporated, San Diego, CA (US)

(72) Inventors: Yongle Wu, San Diego, CA (US); Shivratna Giri Srinivasan, San Diego, CA (US); Won-Joon Choi, San Diego, CA (US); Raghu Narayan Challa, San Diego, CA (US); Amir Aminzadeh Gohari, San Diego, CA (US); Mariam Motamed, Redwood City, CA (US); Thomas James Christol, Boulder, CO (US); Amit Mahajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 14/271,152

(22) Filed: May 6, 2014

(65) Prior Publication Data
US 2014/0335863 A1 Nov. 13, 2014

Related U.S. Application Data

(60) Provisional application No. 61/820,567, filed on May 7, 2013.

(51) Int. Cl.
*H04W 76/28* (2018.01)
*H04W 36/00* (2009.01)

(52) U.S. Cl.
CPC ....... *H04W 36/0083* (2013.01); *H04W 76/28* (2018.02); *Y02D 70/00* (2018.01);
(Continued)

(58) Field of Classification Search
CPC . H04W 72/04; H04W 76/04; H04W 36/0083; H04W 76/048; H04B 17/00; Y02B 60/50
See application file for complete search history.

(56) References Cited

U.S. PATENT DOCUMENTS

| 8,060,153 B2 | 11/2011 | Jeong et al. |
| 2008/0132263 A1 | 6/2008 | Yu et al. |

(Continued)

FOREIGN PATENT DOCUMENTS

| WO | WO-2008072912 A1 | 6/2008 |
| WO | WO-2008084938 A1 | 7/2008 |
| WO | WO-2012000547 A1 | 1/2012 |

OTHER PUBLICATIONS

Ericsson., et al.,: "Test Configuration for Carrier Aggregation RRM Test Cases", 3GPP Draft; R4-114443, 3rd Generation Partnership Project (3GPP), Mobile Competence Centre ; 650, Route Des Lucioles ; F-06921 Sophia-Antipolis Cedex; France, vol. RAN WG4, No. Athens. Greece; 20118822, XP058543507, Aug. 17, 2011 (Aug. 17, 2011), 5 pages.

(Continued)

*Primary Examiner* — Frantz Bataille
(74) *Attorney, Agent, or Firm* — Pattersin & Sheridan, LLC

(57) ABSTRACT

Certain aspects of the present disclosure relate to methods and apparatus for wireless communication, and more particularly, to methods and apparatus that utilize one or more user equipment (UE) panic states under connected discontinuous reception (C-DRX) mode in long term evolution (LTE).

20 Claims, 15 Drawing Sheets

(52) U.S. Cl.
CPC ...... *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/164* (2018.01); *Y02D 70/23* (2018.01); *Y02D 70/24* (2018.01)

(56) References Cited

U.S. PATENT DOCUMENTS

| | | | |
|---|---|---|---|
| 2010/0203887 A1* | 8/2010 | Kim | H04W 4/08 455/434 |
| 2011/0085465 A1 | 4/2011 | Lindoff et al. | |
| 2011/0117954 A1 | 5/2011 | Iwamura et al. | |
| 2011/0207459 A1* | 8/2011 | Ramasamy | H04W 36/0061 455/436 |
| 2012/0252368 A1* | 10/2012 | Edara | H04W 76/28 455/67.11 |
| 2013/0045770 A1 | 2/2013 | Aschan et al. | |
| 2013/0084856 A1* | 4/2013 | Prasad | H04W 36/0088 455/434 |
| 2013/0107742 A1* | 5/2013 | Ishii | H04L 5/001 370/252 |
| 2013/0196659 A1 | 8/2013 | Damji et al. | |
| 2014/0065974 A1 | 3/2014 | Sane | |

OTHER PUBLICATIONS

Huawei: "Consideration on deactivated SCC measurement core requirements in CA", 3GPP Draft; R4-103614, 3rd Generation Partnership Project (3GPP), Mobile Competence Centre ; 650, Route Des Lucioles ; F-06921 Sophia-Antipolis Cedex; France, vol. RAN WG4, No. Xian; 20101011, XP050455304, Oct. 7, 2010 (Oct. 7, 2010), 3 pages.
International Search Report and Written Opinion—PCT/US2014/037081—ISA/EPO—dated Dec. 12, 2014.

* cited by examiner

USER EQUIPMENT PANIC STATE(S) UNDER CONNECTED MODE DISCONTINUOUS RECEPTION STATE IN LONG TERM EVOLUTION

CROSS-REFERENCE TO RELATED APPLICATIONS

The present application for patent claims priority to U.S. Provisional Application No. 61/820,567, filed May 7, 2013, which is assigned to the assignee of the present application and hereby expressly incorporated by reference herein in its entirety.

FIELD

The present disclosure relates generally to wireless communication, and more particularly, to methods and apparatus that utilize different user equipment (UE) states under connected mode discontinuous reception (C-DRX) state in long term evolution (LTE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment (UE). The method generally includes entering a discontinuous reception (DRX) state, while in a connected mode within a serving cell, and determining how often to perform search and measurement of cells neighboring or potentially neighboring the serving cell based on one or more factors indicative of at least one of signal quality in the serving cell or signal quality relative to the serving cell in a cell neighboring or potentially neighboring the serving cell.

Certain aspects of the present disclosure provide a method for wireless communications by a user equipment (UE). The method generally includes configuring a first frequency as a primary component carrier (PCC), configuring a second frequency as a secondary component carrier (SCC), entering a discontinuous reception (DRX) state, while in a connected mode within one or more serving cells, and determining how often to perform search and measurement on the second frequency of cells neighboring or potentially neighboring the one or more serving cells based on whether a measurement triggering event is configured on the SCC.

Aspects generally include methods, apparatus, systems, computer program products, and processing systems, as substantially described herein with reference to and as illustrated by the accompanying drawings. "LTE" refers generally to LTE and LTE-Advanced (LTE-A).

DETAILED DESCRIPTION

Figure 1:
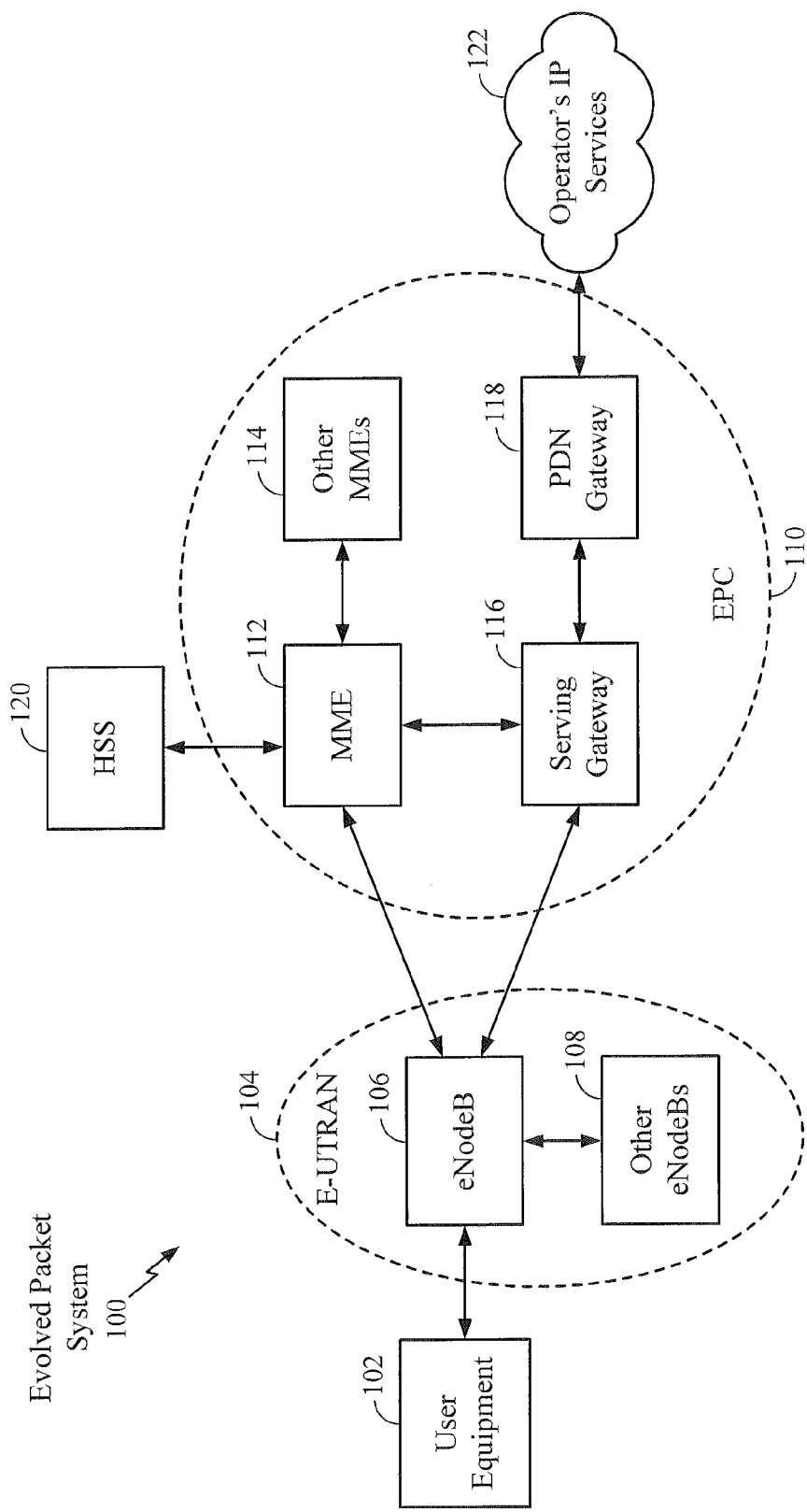
FIG. 1 is a diagram illustrating an example of a network architecture, in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Example Wireless Communication System

FIG. 1 is a diagram illustrating an LTE network architecture 100 in which aspects of the present disclosure may be utilized.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. According to aspects of the present disclosure, UEs 102 may perform operations 1100 illustrated in FIG. 11 and operations 1500 illustrated in FIG. 15.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
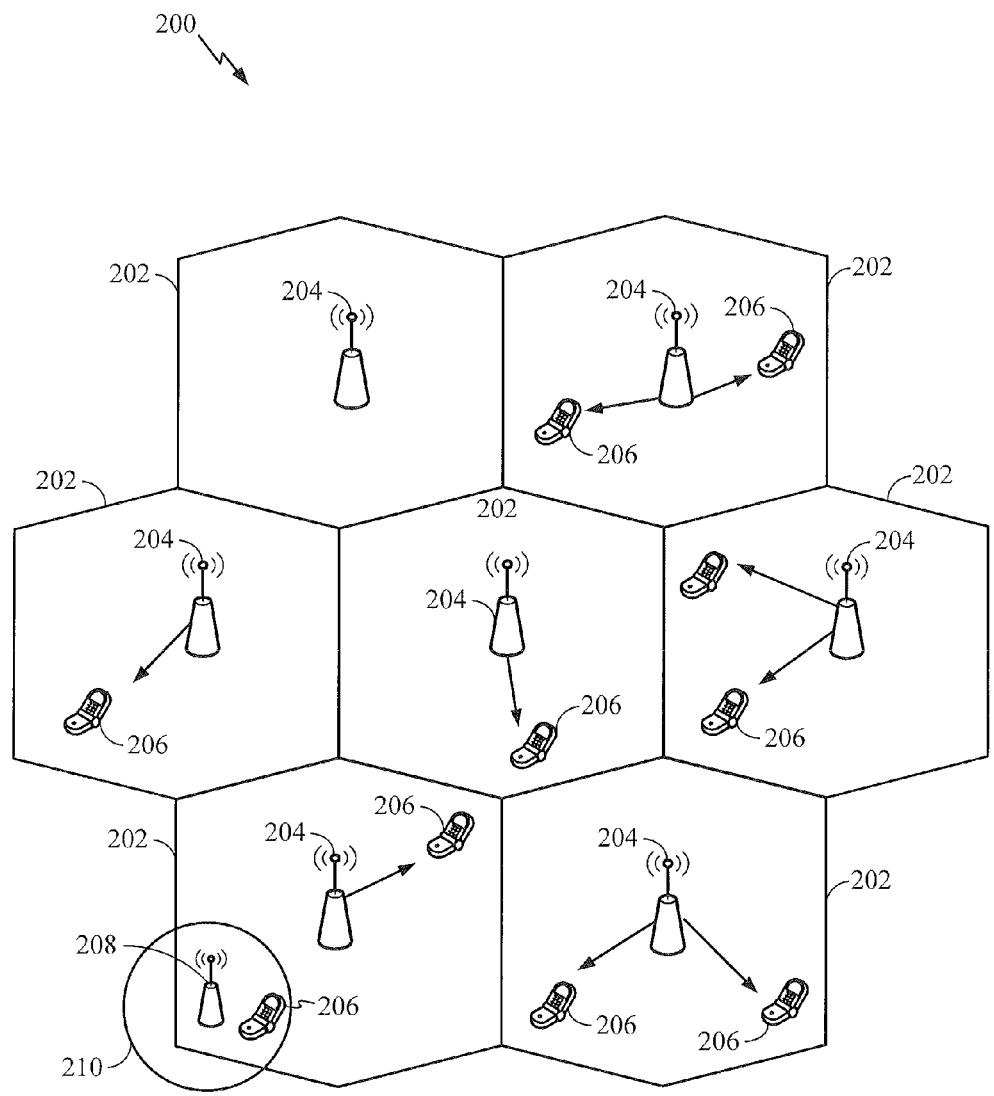
FIG. 2 is a diagram illustrating an example of an access network, in accordance with certain aspects of the disclosure.

FIG. 2 is a diagram illustrating an example access network 200, in which aspects of the present disclosure may be utilized.

Access network 200 is an example of an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one aspect, a UE may serve as a relay. According to aspects of the present disclosure, UEs 206 may also perform operations 1100 illustrated in FIG. 11 and operations 1500 illustrated in FIG. 15.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
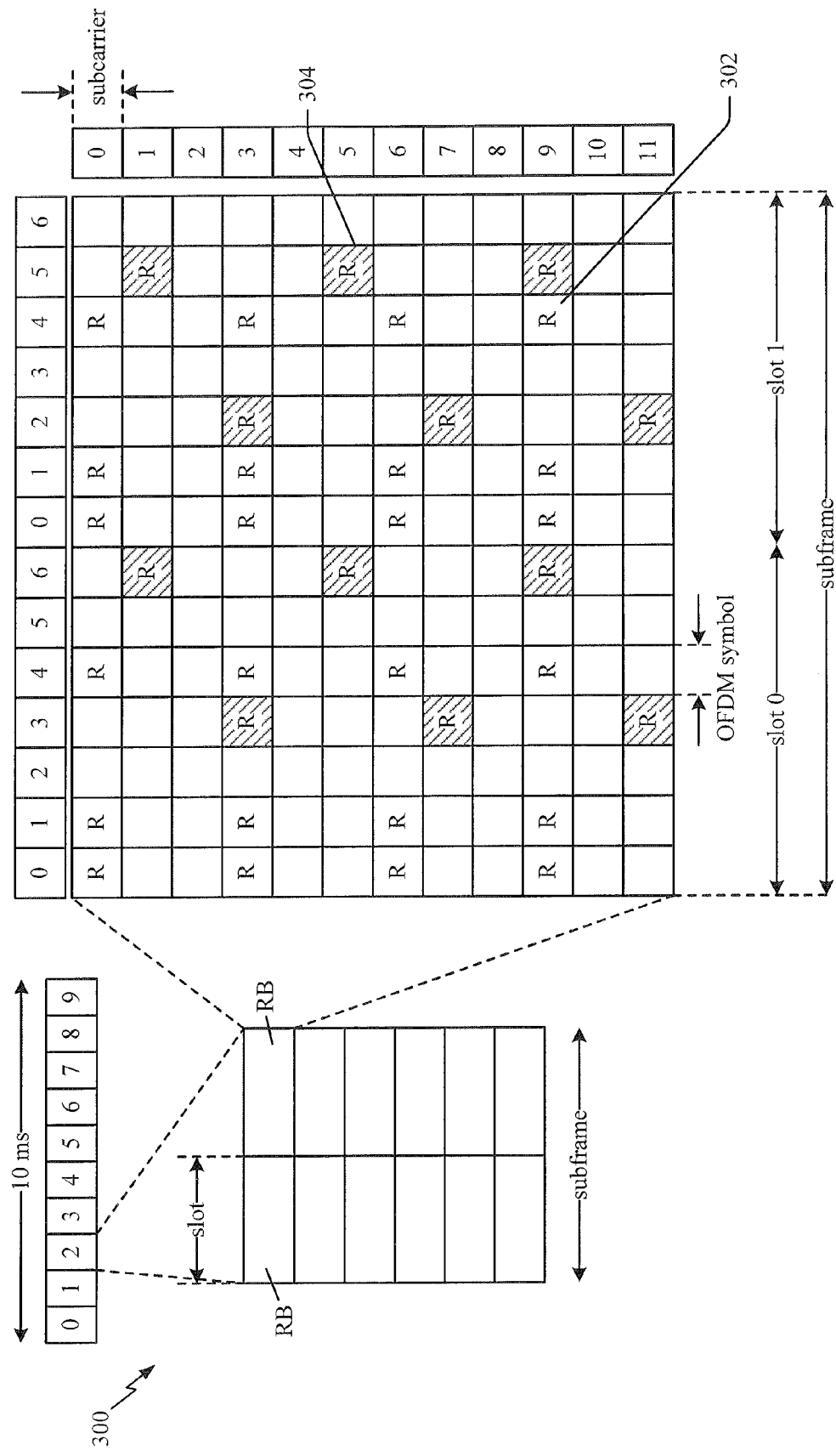
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
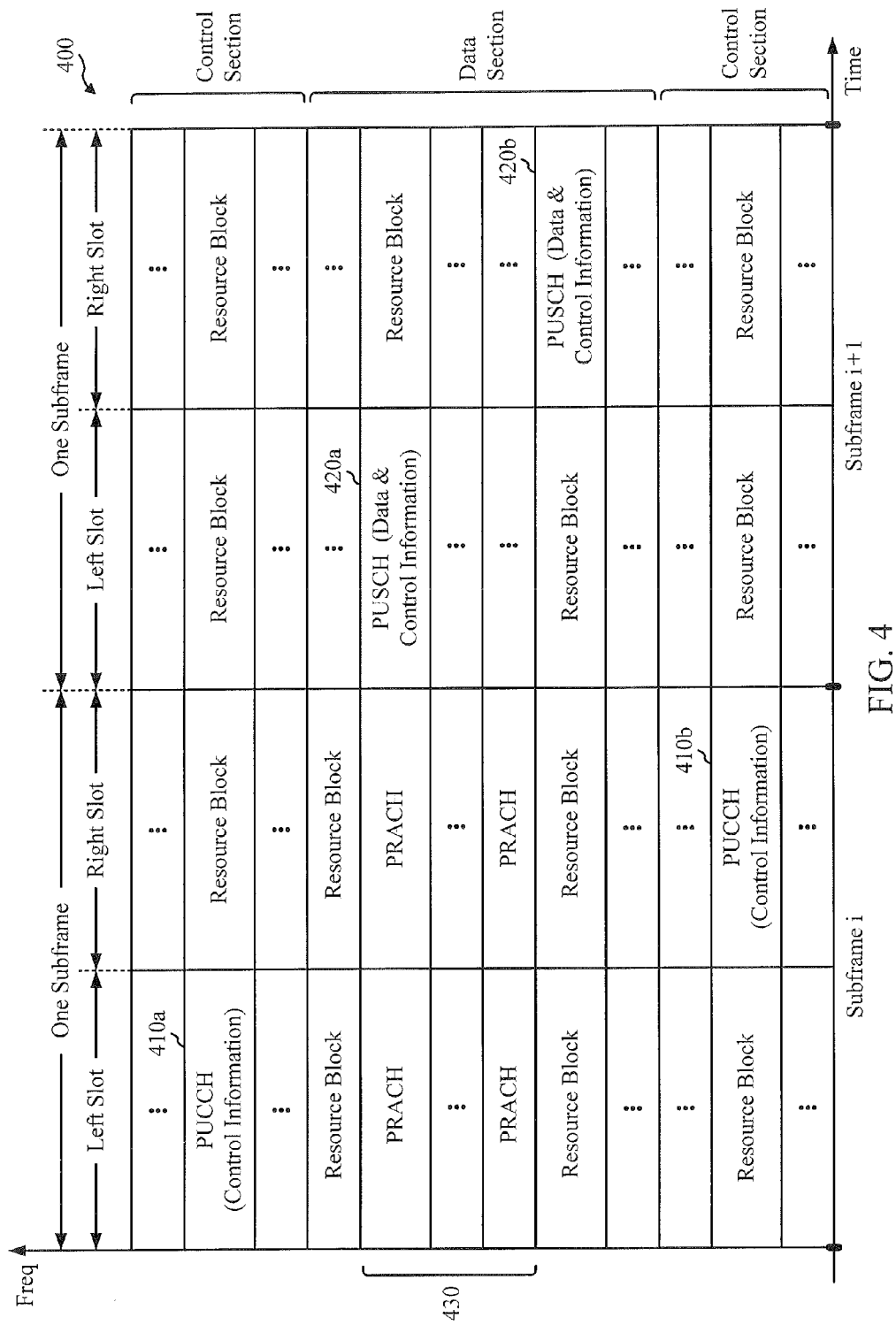
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of a few contiguous subframes and a UE can make only a single PRACH attempt per frame (10 ms).

Figure 5:
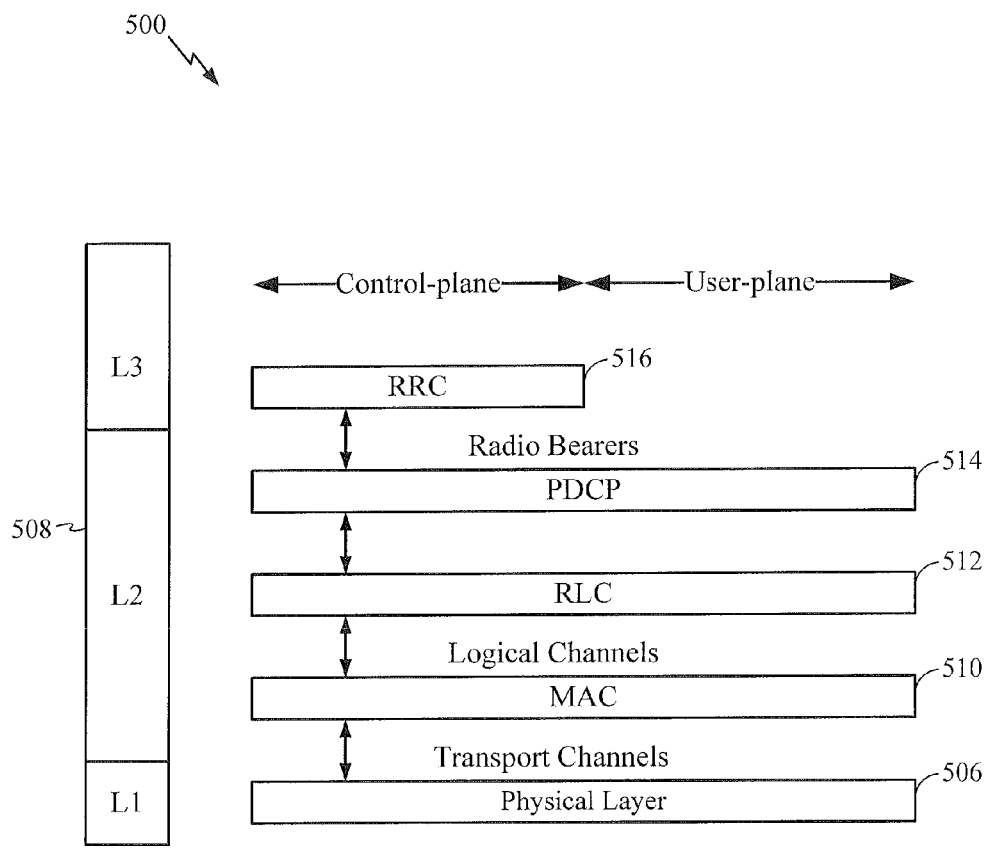
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
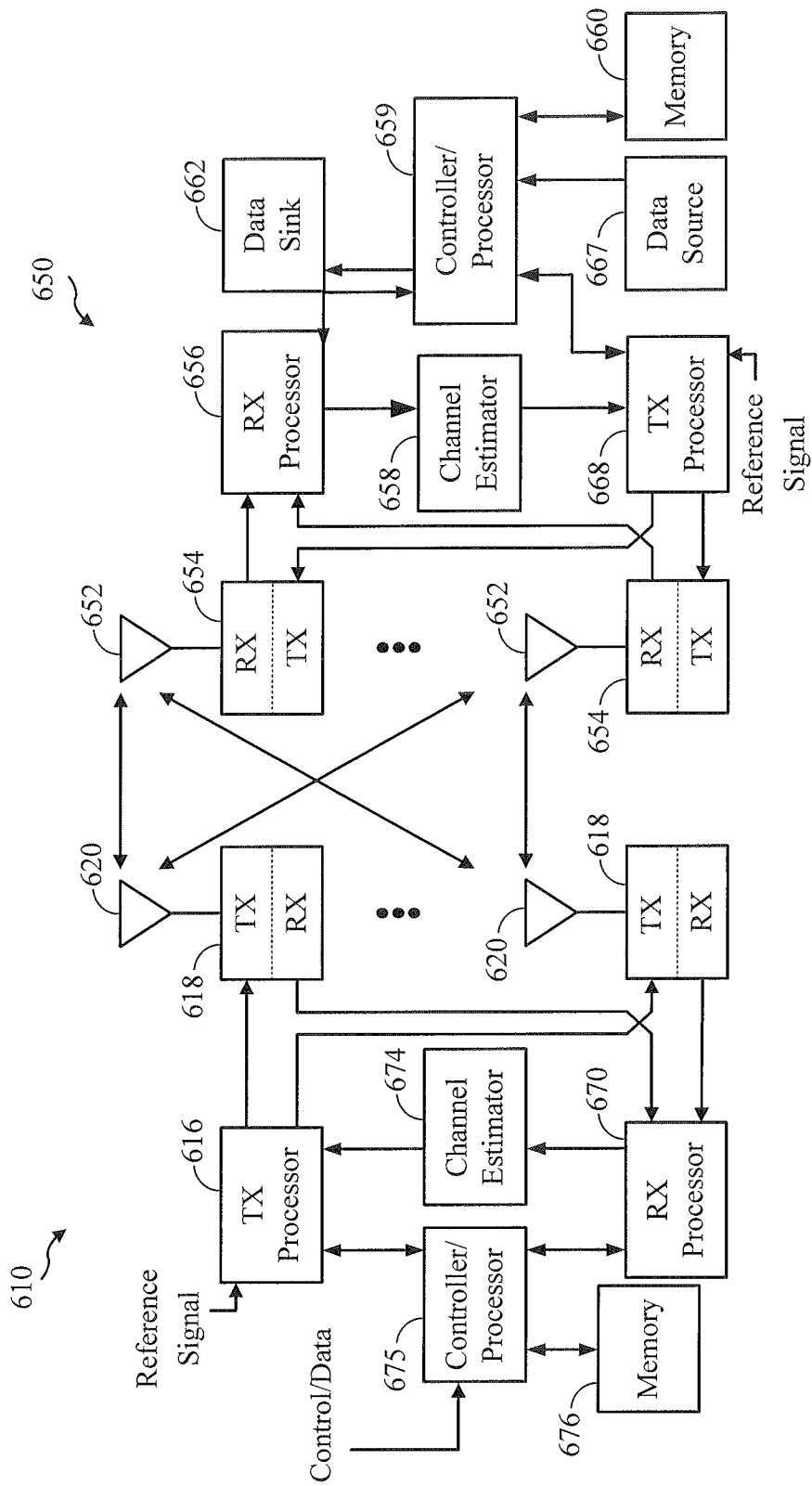
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. As described in further detail below, according to certain aspects of the present disclosure, the channel estimates may also be used in determining how often to perform search and measurement of neighboring and potentially neighboring cells of the serving cell. The spatial streams generated by the TX processor 668 are provided to different antennas 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, and control signal processing to recover upper layer packets from the UE 650. Upper layer packets from the controller/processor 675 may be provided to the core network. The controller/processor 675 is also responsible for error detection using an ACK and/or NACK protocol to support HARQ operations. In aspects, the controller/processor 659, receive processor 656, transmit processor 668 and/or other processors and modules at the UE 650 may perform or direct operations and/or processes for the techniques (e.g., operations 1100 in FIG. 11 and operations 1500 in FIG. 15) described herein. In aspects, the controller/processor 675, receive processor 670, transmit processor 616 and/or other processors and modules at the eNB 610 may perform or direct operations and/or processes for the techniques described herein.

In LTE wireless communications, a UE may determine that certain events have occurred, based on signal strength measurements of a serving cell and neighboring cells. For example, a UE may determine that an A3 event has occurred, based on the UE determining that the signal strength of the UE's serving cell has fallen below a threshold. In a second example, a UE may determine that an A5 event has occurred, based on determining that signal strength of a neighboring cell is a threshold amount higher than signal strength of the UE's serving cell.

Carrier Aggregation

LTE-Advanced UEs may use spectrum divided into carriers of up to 20 MHz bandwidth allocated in a carrier aggregation of up to a total of 100 MHz (5 carriers or serving frequencies) for transmission in each direction. When carriers are aggregated, each individual carrier may be referred to as a component carrier. For the LTE-Advanced mobile systems, two types of carrier aggregation (CA) methods have been proposed, contiguous CA and non-contiguous CA. Both non-contiguous and contiguous CA aggregate multiple component carriers to serve a single LTE Advanced UE.

According to various embodiments, a UE operating in a multicarrier (also referred to as carrier aggregation) system is configured to aggregate certain functions of multiple carriers, such as control and feedback functions, on the same carrier, which may be referred to as a primary carrier or primary component carrier (PCC). A carrier that depends on a primary carrier for support is referred to as an associated secondary carrier or a secondary component carrier (SCC). For example, the UE may aggregate control functions such as those provided by a physical uplink control channel (PUCCH), and/or a physical downlink control channel (PDCCH). CA can improve overall transmission efficiency, in that only resources on the primary carrier are used for control functions, while all of the secondary carriers are available for data transmission. Thus, the ratio of transmitted data to control functions may be increased by CA, when compared to non-CA techniques.

Figure 7:
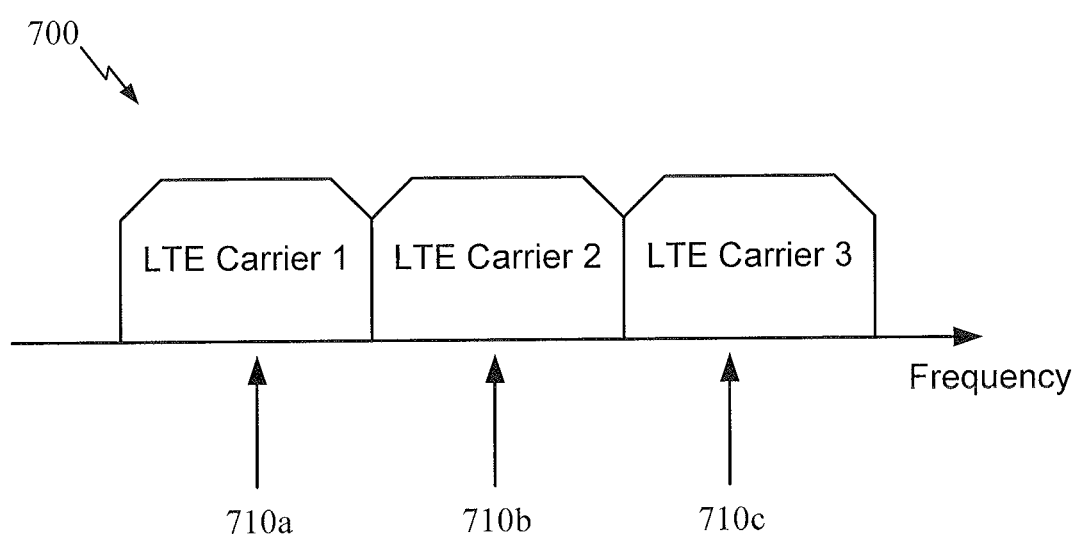
FIG. 7 illustrates contiguous carrier aggregation (CA), in accordance with certain aspects of the disclosure.

FIG. 7 illustrates contiguous CA 700, in which multiple available component carriers 710 adjacent to teach other in frequency are aggregated.

Figure 8:
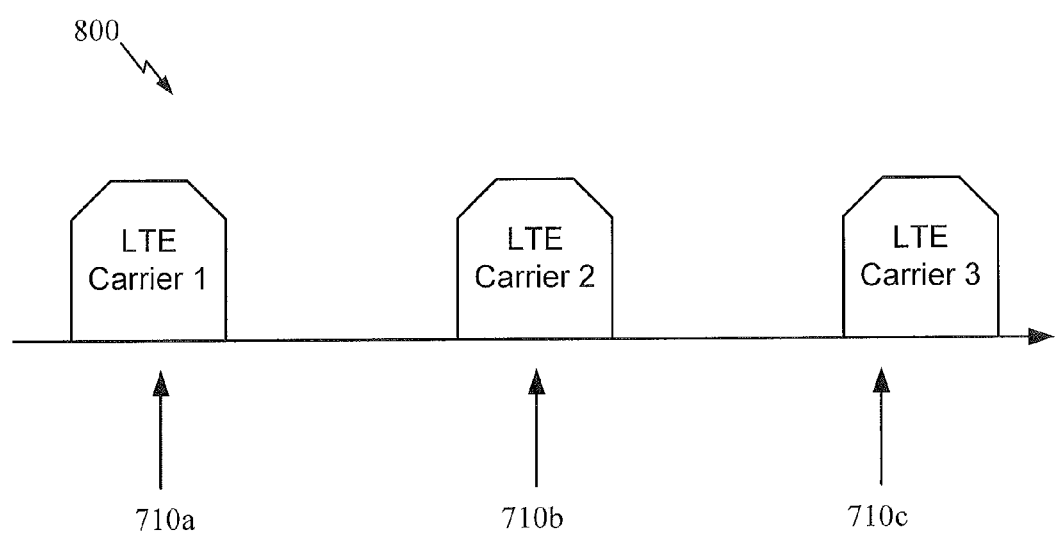
FIG. 8 illustrates non-contiguous carrier aggregation, in accordance with certain aspects of the disclosure.

FIG. 8 illustrates non-contiguous CA 800, in which multiple available component carriers 710 separated in frequency are aggregated.

Figure 9:
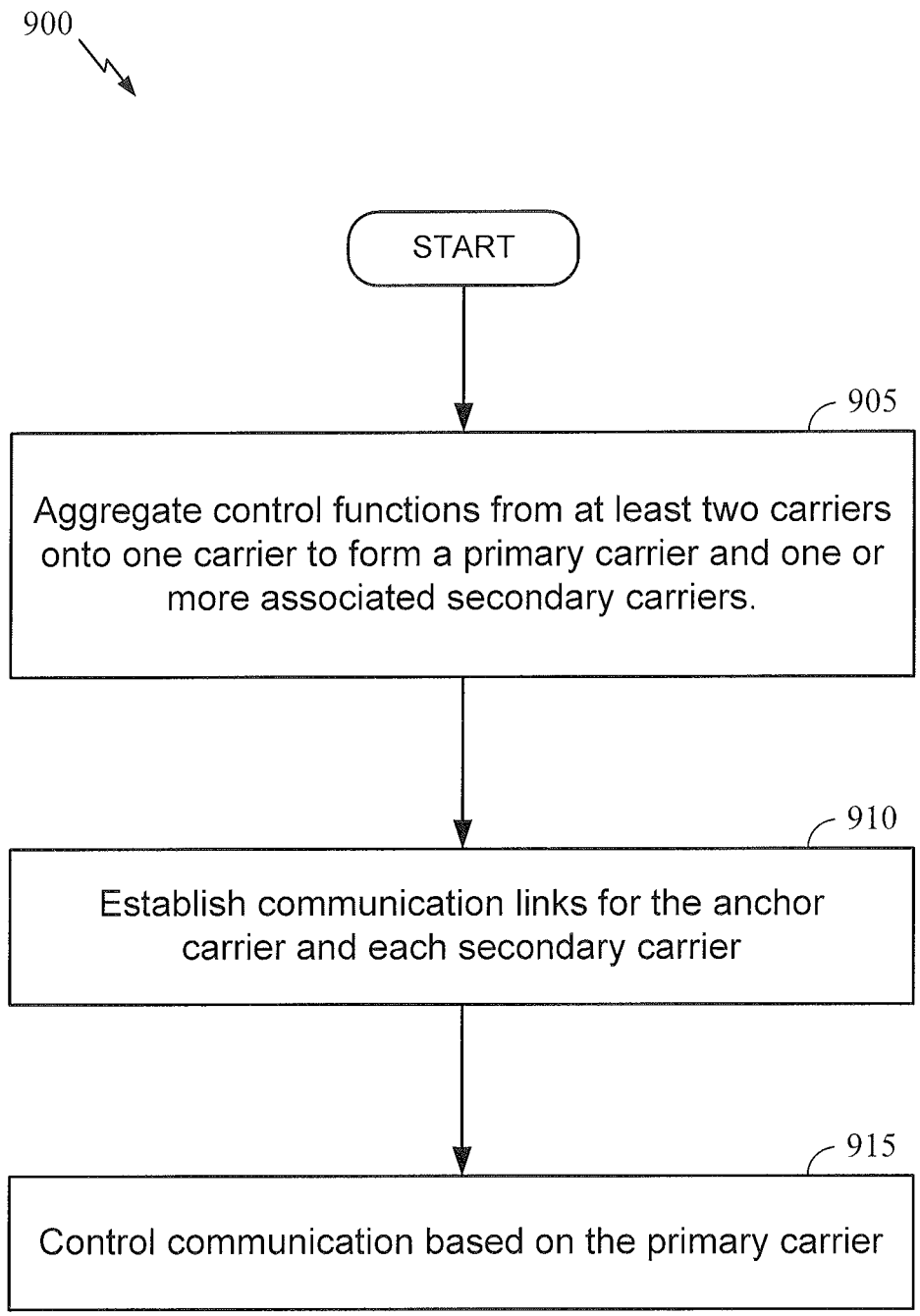
FIG. 9 illustrates example operations, in accordance with certain aspects of the disclosure.

FIG. 9 illustrates a method 900 for controlling radio links in a multiple carrier wireless communication system by grouping physical channels according to one example. As shown, the method includes, at block 905, aggregating control functions from at least two carriers onto one carrier to form a primary carrier and one or more associated secondary carriers. For example, all of the control functions for component carriers 710a, 710b, and 710c in FIG. 7 may be aggregated on component carrier 710a, which acts as a primary carrier for the aggregation of carriers 710a, 710b, and 710c. Next at block, 910, communication links are established for the primary carrier and each secondary carrier. For example, a UE associating with an eNodeB receives configuration information regarding the component carriers 710a, 710b, and 710c, and configuration information indicating mappings between control information to be received on primary carrier 710a and associated secondary carriers 710b and 710c. Then, communication is controlled based on the primary carrier in block 915. For example, an eNodeB may transmit a PDCCH to a UE on primary carrier 710a conveying a downlink grant to the UE for a PDSCH directed to the UE and transmitted by the eNodeB on secondary carrier 710b.

Each carrier in a system using CA may serve a coverage area independent of the coverage areas of other carriers. A base station transmitting a primary component carrier and a coverage area of that primary component carrier may be referred to as a primary cell or PCell, depending on context. A base station transmitting a secondary component carrier and a coverage area of a secondary component carrier may be referred to as a secondary cell or SCell, depending on context. The coverage areas of PCells and SCells may consist of substantially identical areas, or may differ significantly.

Figure 10A:
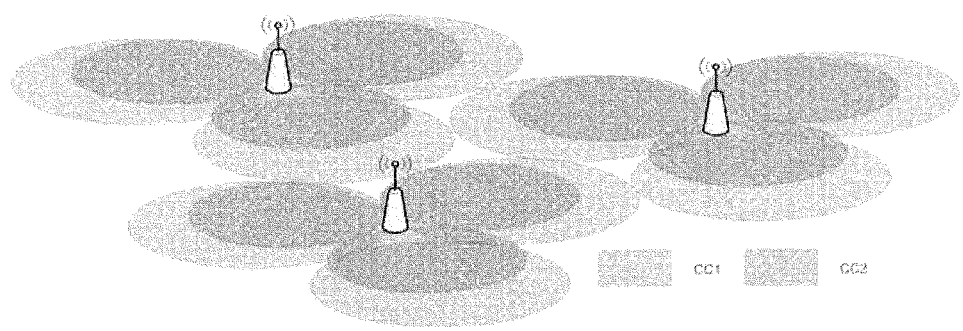
FIGS. 10A, 10B, and 10C illustrate example networks of primary cells (PCells) and secondary cells (SCells), in accordance with certain aspects of the disclosure.
Figure 10B:
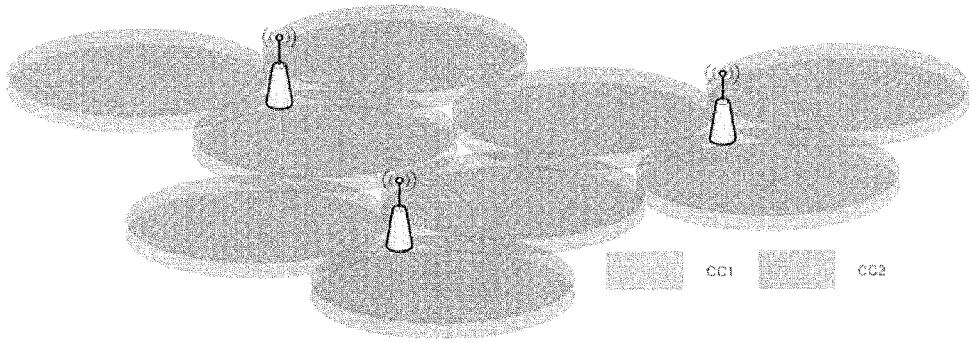
Figure 10C:
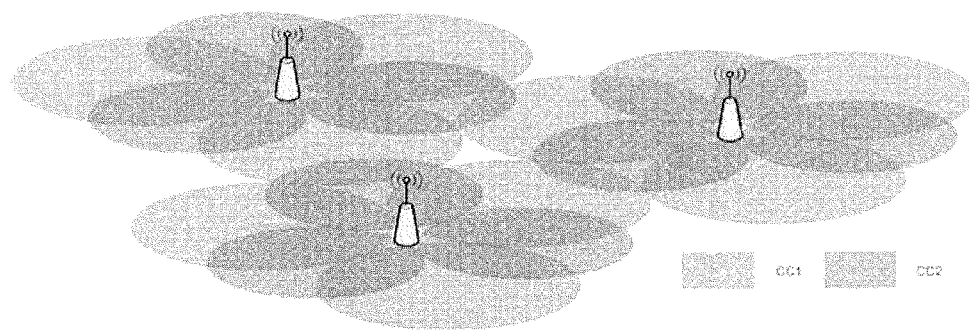

FIGS. 10A, 10B, and 10C illustrate example networks of PCells and SCells, wherein the PCells and SCells cover varying areas. FIG. 10A illustrates a network wherein the PCells and SCells cover areas of different sizes, but in similar directions from the base stations. FIG. 10B illustrates a network wherein the PCells cover substantially identical areas, in accordance with aspects of the present disclosure. FIG. 10C illustrates an example network, wherein the PCells and SCells cover differing areas, in accordance with aspects of the present disclosure. The PCells and SCells may be supported by a single base station, or multiple base stations.

A secondary cell may be in an activated or deactivated state with respect to a UE, depending on commands from a base station or other network entity. When a SCell is deactivated with respect to a UE, the UE is not transmitting or receiving transmissions on the SCC used by the SCell. The UE may have powered down or reconfigured a transmitter, receiver, or transceiver that the UE would use for transmitting or receiving on that SCC. The UE may, for example, turn off a receiver in order to save power and/or improve battery performance. The UE may still be configured with information regarding that SCC, and the SCell may be activated with respect to the UE upon receipt of appropriate commands from a base station or other network entity.

User Equipment Panic State(s) in Connected Mode Discontinuous Reception State in LTE When a UE, for example one of the UEs 206, camps on an LTE cell, for example one of the cells 202, the UE needs to search for and measure signal quality of neighboring or potentially neighboring cells from time to time. When the UE detects a strong neighboring cell, the UE may reselect to or handover to the neighboring cell, which will generally result in better performance (for example, higher throughput) and/or reduce the risk of radio link failure due to strong interference. This is especially important to support mobile UEs, as the strongest cell often changes due to the movement of the UE through the coverage regions of various cells.

3GPP TS 36.133, "Evolved Universal Terrestrial Radio Access (E-UTRA); Requirements for support of radio resource management," which is publicly available, specifies the minimal requirement of how often a UE needs to detect and measure neighboring and potentially neighboring cells ("neighboring cells" will be understood to include neighboring and potentially neighboring cells hereinafter). UEs may have differing implementations of search and/or measurement of neighboring cells. Each UE implementation may determine the periodicity of neighboring cell search and/or measurement by any method, as long as the neighboring cell search and/or measurement periodicity meets the requirement in the specification.

The following tables are from 3GPP TS 36.133, "Evolved Universal Terrestrial Radio Access (E-UTRA); Requirements for support of radio resource management." For example, the tables may be used to determine the minimum required neighboring cell search and measurement periodicities for FDD intrafrequency cells for UEs performing DRX with defined DRX cycle lengths. An intrafrequency cell is a cell transmitting on the same carrier frequency as a UE's serving cell.

TABLE 8.1.2.2.1.2-1

Requirement to identify a newly detectable FDD intrafrequency cell

| DRX cycle length (s) | $T_{identify\ intra}$ (s) (DRX cycles) |
|---|---|
| ≤0.04 | 0.8 (Note 1) |
| 0.04 < DRX-cycle ≤ 0.08 | Note 2 (40) |
| 0.128 | 3.2 (25) |

TABLE 8.1.2.2.1.2-1-continued

Requirement to identify a newly detectable FDD intrafrequency cell

| DRX cycle length (s) | $T_{identify\ intra}$ (s) (DRX cycles) |
|---|---|
| 0.128 < DRX-cycle ≤ 2.56 | Note 2 (20) |

Note 1
Number of DRX cycles depends upon the DRX cycle in use
Note 2:
Time depends upon the DRX cycle in use

TABLE 8.1.2.2.1.2-2

Requirement to measure FDD intrafrequency cells

| DRX cycle length (s) | $T_{measure\ intra}$ (s) (DRX cycles) |
|---|---|
| ≤0.04 | 0.2 (Note 1) |
| 0.04 < DRX-cycle ≤ 2.56 | Note 2 (5) |

Note 1:
Number of DRX cycle depends upon the DRX cycle in use
Note 2:
Time depends upon the DRX cycle in use If a UE schedules neighboring cell search and measurement very often, it may always find neighboring cells very quickly. Performing neighboring cell search and measurement very often gives the best mobility performance, in that finding neighboring cells very quickly may allow the UE to find and reselect to neighboring cells offering superior connectivity as the UE moves through the coverage regions of the neighboring cells. However, performing search and measurement very often causes the UE to consume more power and/or worsens the UE's power performance when compared to performing search and measurement at the minimum rates required by the specification. On the other hand, if the UE schedules search and measurement at the minimum rate required by the specification, the UE may significantly decrease its power consumption and/or improve its power performance. However, the UE will not track neighbors closely and/or may suffer from poor connectivity while moving due to the UE failing to find and reselect to neighboring cells as the UE is moving through the neighboring cells' coverage regions.

A panic mode has been implemented when some UEs camp on LTE cells and stay in idle mode. According to certain aspects, one or more states (e.g., panic states) for connected mode DRX (C-DRX) are disclosed. Voice over LTE (VoLTE) is an example of a C-DRX application, wherein power consumption is an extremely important concern.

For a good tradeoff between mobility performance and power consumption, according to certain aspects, an adaptive way to schedule neighboring cell search and/or measurement is disclosed. According to certain aspects, when a UE has an indication that there may be potential strong neighboring cells, that is, when the UE enters a "panic mode" state, the UE may schedule neighboring cell search and/or measurement much more often than when the UE is not in a "panic mode" state; otherwise, the UE may maintain the minimum neighboring cell search and/or measurement activity in order to conserve power.

According to certain aspects, use of three states for determining neighboring cell search and/or measurement periodicity is disclosed. The three states may be described as normal mode, light panic mode and panic mode. When a UE is in normal mode, it may schedule neighboring cell search and/or measurement at the minimum level required by the specification. When the UE is in the light panic mode, the UE is likely to have strong neighboring cells nearby, and the UE may schedule neighboring cell search and/or measurement more often than when the UE is in normal mode. Finally, when the UE is in panic mode, the UE may have difficulty maintaining the communication link to the UE's serving cell and/or a strong neighboring cell is highly likely, and neighboring cell search and/or measurement will therefore be scheduled even more often than when the UE is in light panic mode.

According to certain aspects, conditions at a UE may be used as input to decide which state (i.e., mode) the UE is in. In aspects, conditions at a UE may be based on a quality, strength and/or power of a signal associated with the serving cell(s) and/or one or more neighboring cells. Examples of conditions at a UE which may be used as input to decide which state the UE is in include: signal to noise ratio (SNR) of the serving cells (either primary cell or secondary cells), reference signal received quality (RSRQ) of the serving cells (either primary cell or secondary cells), configuration of specific measurement events, configured offsets and thresholds for specific measurement events, satisfying the conditions to enter a measurement event, and DL decoding failures at the UE.

According to certain aspects, an algorithm may be used to determine which state (e.g., panic mode state) a UE should transition to or remain in. Values or one or more parameters or an occurrence of an event or events may be used in determining which state a UE should transition to or remain in. An example algorithm is presented below:

| Pseudo-code | Notes |
|---|---|
| If (RSRQ < threshold1) OR (SNR < threshold2) OR (measurement event A3) OR (CRC fail for P-RNTI) | If the UE is having difficulty maintaining a communication link to the UE's serving cell, then |
| {<br>  Panic mode;<br>} | Transition to or remain in a state wherein the UE is performing neighboring cell search and measurement at maximum rates; |
| Else if (RSRQ < threshold3) OR (SNR < threshold4) OR (measurement event A2) | If the UE did not transition to or remain in the state with maximum neighboring cell search and measurement rates, then if conditions imply that there is likely a neighboring cell stronger than the UE's serving cell, then |
| {<br>  Light panic mode;<br>} | Transition to or remain in a state wherein the UE is performing neighboring cell search and measurement at rates higher than default rates; |
| Else | If none of the above is true, then the below applies. |
| {<br>  Normal mode.<br>} | Transition to or remain in normal mode, which is the default state in this code snippet. |

Satisfying the conditions to enter "measurement event A3" may mean that the UE has measured a neighboring cell which is better than the serving cell (e.g., the neighboring cell's RSRQ is higher than the serving cell's RSRQ) by more than the network configured amount. An occurrence of satisfying the conditions to enter "measurement event A2" may mean the serving cell's quality (e.g., RSRP or RSRQ), as measured by the UE, has fallen below the network configured threshold. An occurrence of "CRC fail for P-RNTI" may mean the UE is not able to decode a paging signal from the serving cell, which is usually low-rate and easy to decode. Each of these occurrences may imply that the UE's connection to its serving cell may be in a poor condition, and more frequent neighboring cell search and measurement may be helpful to quickly reselect to a neighboring cell offering a superior connection to the UE. Although specific serving cell-metrics, events and/or occurrences are described above, other metrics, events and/or occurrences may be employed in determining which state a UE should transition to or remain in. Although measurement events A2 and A3 are described above, other measurements may be employed as well, such as A5.

Figure 11:
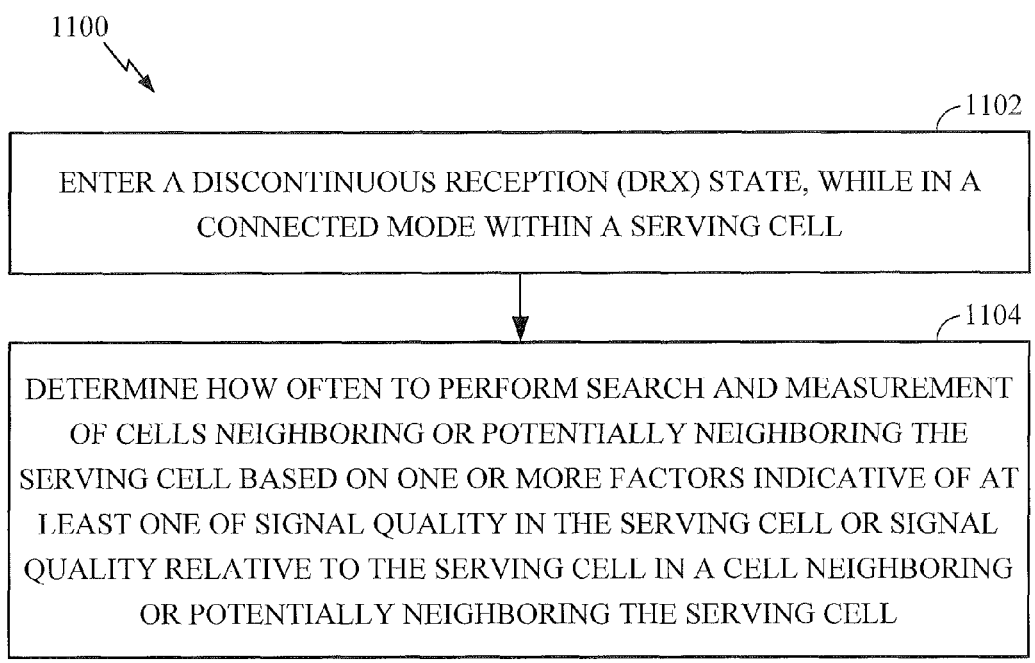
FIG. 11 illustrates example operations performed, for example, by a user equipment (UE), according to certain aspects of the disclosure.

FIG. 11 illustrates example operations 1100 performed, for example, by a UE, such as UE 206. At 1102, the UE may enter a discontinuous reception (DRX) state, while in a connected mode (e.g., RRC connected mode) within a serving cell. At 1104, the UE may determine how often to perform search and measurement of cells neighboring or potentially neighboring the serving cell based on one or more factors indicative of at least one of signal quality in the serving cell or signal quality relative to the serving cell in a cell neighboring or potentially neighboring the serving cell.

According to certain aspects, the UE may perform search and measurement of cells neighboring or potentially neighboring the serving cell as often as determined. For example, a UE may be configured to perform search and measurement of neighboring cells at the minimum rate specified in 3GPP TS 36.133 when in normal mode, during every other DRX cycle when in light panic mode, and during every DRX cycle when in panic mode. In the example, the UE may be operating in a C-DRX state, with a DRX cycle of length 0.08 s, in normal mode, measuring intrafrequency FDD neighbor cells during every fifth DRX cycle, as per Table 8.1.2.2.1.2-2. In the example, the UE may be in a second DRX cycle of the five-cycle measurement interval when the UE determines to transition to panic mode. In the example, the UE may immediately begin performing search and measurement during every DRX cycle and not wait until the end of the five-cycle measurement interval of the normal mode before changing to performing search and measurement during every DRX cycle.

According to certain aspects, the one or more factors comprise at least one of: a metric related to reception of a reference signal of the serving cell, a signal to noise ratio (SNR) of the serving cell, occurrence of a measurement triggering event, or an occurrence of a decoding failure of a downlink (DL) channel in the serving cell. For example, a UE may determine which state to transition to or remain in based on RSRP of the serving cell, RSRQ of the serving cell, SNR of the serving cell, occurrence of measuring event A3, occurrence of measuring event A2, or a failure in decoding a paging message from the serving cell.

According to certain aspects, the determining comprises determining whether the UE is in one of a plurality of states, based on the one or more factors; and each state has a corresponding periodicity for performing search of cells neighboring or potentially neighboring the serving cell and a corresponding periodicity for performing measurement of cells neighboring or potentially neighboring the serving cell. In aspects, such periodicities may be different than those periodicities associated with a UE configuration provided by the network, for example. In this manner, the UE may dynamically update such search and/or measurement periodicities based on panic mode state.

According to certain aspects, periodicities of a first state correspond to minimum defined requirements for how often to perform search and measurement of cells neighboring or potentially neighboring the serving cell. For example, a UE may be configured to perform search and measurement of neighboring cells at the minimum rates listed in Tables 8.1.2.2.1.2-1 and 8.1.2.2.1.2-2 from 3GPP TS 36.133 when in a first state.

According to certain aspects, the plurality of states comprises at least a first and second state; and periodicities for performing search and measurement of cells neighboring or potentially neighboring the serving cell for each of the first and second states are such that search and measurements are performed more often for the second state than for the first state. For example, periodicities of a first state may be per the maximum periodicities (i.e., minimum rates) listed in Tables 8.1.2.2.1.2-1 and 8.1.2.2.1.2-2 from 3GPP TS 36.133, while periodicities of a second state may be defined to be half of the periodicities (i.e., double the rates) of the first state.

According to certain aspects, the plurality of states comprises at least a first, second, and third state; and periodicities for performing search and measurement of cells neighboring or potentially neighboring the serving cell for each of the first, second, and third states are such that searches and measurements are performed more often for the second state than for the first state and more often for the third state than for the second state.

According to certain aspects, determining whether the UE is in one of a plurality of states, based on the one or more factors, includes determining the UE is in the third state if at least one of: a metric related to reception of a reference signal of the serving cell is less than a first threshold value, a signal to noise ratio (SNR) of the serving cell is less than a second threshold value, a first measurement triggering event occurs, or a decoding failure of a downlink (DL) channel in the serving cell occurs. For example, a UE may determine to transition to or remain in the third state if RSRQ of the UE's serving cell drops below a first threshold value, SNR of the UE's serving cell drops below a second threshold value, measuring event A3 occurs, or the UE fails in decoding a paging message from the serving cell.

According to certain aspects, determining whether the UE is in one of a plurality of states, based on the one or more factors, further comprises determining the UE is in the second state if at least one of: the metric related to reception of the reference signal of the serving cell is less than a third threshold value, the SNR of the serving cell is less than a fourth threshold value, or a second measurement triggering event occurs. For example, a UE may determine to transition to or remain in the second state based if RSRQ of the serving cell drops below a third threshold value, SNR of the serving cell drops below a fourth threshold value, or measuring event A2 occurs.

According to certain aspects, determining whether the UE is in one of a plurality of states, based on the one or more factors, further comprises determining the UE is in the first state if the UE is not determined to be in either the second or third states. For example, a UE may determine to transition to or remain in the first state if RSRQ of the serving cell is at least equal to the third threshold value, SNR of the serving cell is at least equal to the fourth threshold value, measuring events A2 and A3 have not occurred for at least two DRX cycles, and the UE has successfully decoded a most recent paging message from the serving cell.

User Equipment Panic State(s) in Connected Mode Discontinuous Reception State with Carrier Aggregation When a UE, for example one of the UEs 206, is configured to receive using multiple carriers in a CA system, the UE needs to search for and measure signal quality of neighboring or potentially neighboring cells on each of the carriers from time to time. When the UE detects a strong neighboring cell operating on a particular carrier, an eNB may handover the UE to the neighboring cell on that carrier (e.g., a PCell change) or change the secondary cell with that neighbor (e.g., an SCell change), which will generally result in better performance (for example, higher throughput). In addition, handing over on the primary cell (PCell) may also reduce the risk of radio link failure. This is especially important to support mobile UEs, where the primary and secondary component carriers may have different coverage, as the strongest cell often changes due to the movement of the UE through the coverage regions of various cells.

As described above, if a UE schedules neighboring cell search and measurement very often, it may always find neighboring cells very quickly. Performing neighboring cell search and measurement very often gives the best mobility performance, in that finding neighboring cells very quickly may allow the UE to find and reselect to neighboring cells offering superior connectivity as the UE moves through the coverage regions of the neighboring cells. However, performing search and measurement very often causes the UE to consume more power and/or worsens the UE's power performance when compared to performing search and measurement at the minimum rates required by the specification. On the other hand, if the UE schedules search and measurement at the minimum rate required by the specification, the UE may significantly decrease its power consumption and/or improve its power performance. However, the UE will not track neighbors closely and/or may suffer from poor connectivity while moving due to the UE failing to find and reselect to neighboring cells as the UE is moving through the neighboring cells' coverage regions.

SCC search and measurements by a UE are considered intra-frequency measurements. UEs may therefore perform SCC measurements per the time periods defined in Section 8.3 of 3GPP 36.133 for deactivated/active states. A UE may perform SCC measurements regardless of whether an SCell is activated for the UE.

A SCC may be configured for a UE even though the UE may be outside of all SCell coverage areas. A UE configured with an SCC outside of all SCell coverage areas is not considered to be in a radio link failure (RLF) condition, because the UE may still be connected on a PCC. Therefore, a UE should continue searching for and measuring an SCell and its neighbors, even when outside of all SCell coverage areas.

A UE may handover from a PCell to an SCell. This handover can occur whether the SCell is activated or deactivated. For example, a UE may be configured for CA with a PCell and an SCell, with the SCell deactivated. In the example, the UE may be moving out of the coverage area of the UE's serving PCell, and the serving PCell may command the UE to handover to an SCell. In the example, the UE may be reconfigured to treat the SCC as a new primary carrier, and the UE may handover to a new PCell, which was formerly the SCell.

A UE may handover from a PCell handover to a neighbor cell on the same carrier as a UE's current SCC. This handover can occur whether the SCell is activated or deactivated. For example, a UE may be configured for CA with a PCC and an SCC, with the SCC deactivated. In the example, the UE may be moving out of the coverage area of the UE's serving PCell, and the serving PCell may command the UE to handover to a neighbor cell on the same carrier as the UE's current SCC. In the example, the UE may be reconfigured to treat the SCC as a new primary carrier, and the UE may handover to the neighbor cell, treating the neighbor cell as a PCell.

A UE may "swap" the UE's current SCell with a neighboring cell operating on the UE's current SCC. For example, a UE may be configured to be served by a PCell and an SCell, and may determine through cell search and measurement that a neighboring cell has a stronger signal on the SCC. In the example, the UE may be commanded to configure the neighboring cell as a new SCell for the UE, and the UE may receive transmissions on the SCC from the neighboring cell, while still being served on the PCC by the UE's PCell.

As shown in FIGS. 10A, 10B, and 10C, primary and secondary serving cell (e.g., PCell and SCell) coverage areas may not coincide. PCell coverage areas may be larger or smaller than SCell coverage areas. In addition, PCell coverage areas and SCell coverage areas may overlap such that each PCell coverage area overlaps more than one SCell coverage area, and each SCell coverage area may overlap more than one PCell coverage area. The variations in coverage areas between a PCell and SCells and operations with multiple carriers may lead to handovers for UEs operating with CA that are less optimal than handovers for UEs operating on only a single carrier (i.e., without CA), in certain situations.

Figure 12A:
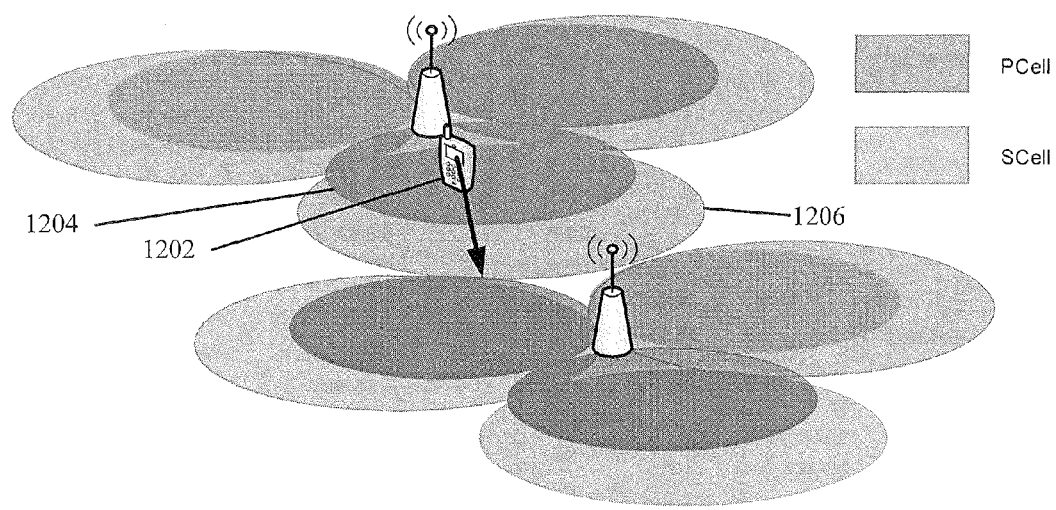
FIGS. 12A and 12B illustrate an example of a UE operating with CA, in accordance with certain aspects of the disclosure.
Figure 12B:
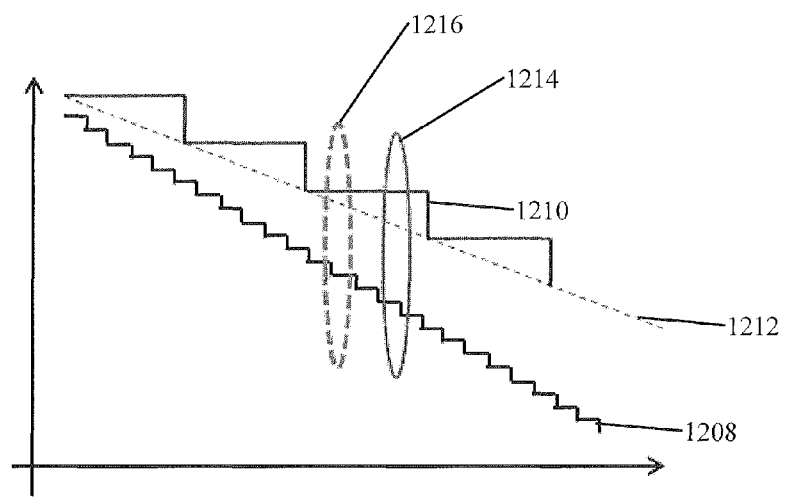

FIGS. 12A and 12B illustrate a first example of a UE operating with CA performing a handover that is less optimal than a handover the UE would perform if operating on only a single carrier. In the example, UE 1202 is moving out of the UE's PCell coverage area 1204, while still within the UE's SCell coverage area 1206. In the example, the SCell is deactivated for the UE. Also in the example, because the SCell is deactivated, the UE measures the SCell less often than the UE measures the PCell. Because the UE is moving away from the base station in the example, the signal strengths of the PCell and the SCell are both decreasing. However, because the UE is measuring the SCell less often than the PCell, the UE determines that the PCell's signal strength has decreased more often than the UE determines that the SCell's signal strength has decreased, as illustrated by the graph in FIG. 12B. The stepped line 1208 represents the measurements of the PCell, while the stepped line 1210 represents the measurements of the SCell. The dashed line 1212 represents the actual power level of the SCell received at the UE. In the example, the UE is commanded to handover from the PCell to the SCell when the SCell's signal strength exceeds the signal strength of the PCell by a threshold amount. The solid ellipse 1214 indicates when this should occur, based on the measurement of the PCell and the actual signal strength of the SCell. In the example, the handover is triggered at the dashed ellipse 1216, because the UE measures the PCell's decreasing signal strength more often than the UE measures the SCell's decreasing signal strength.

Figure 13A:
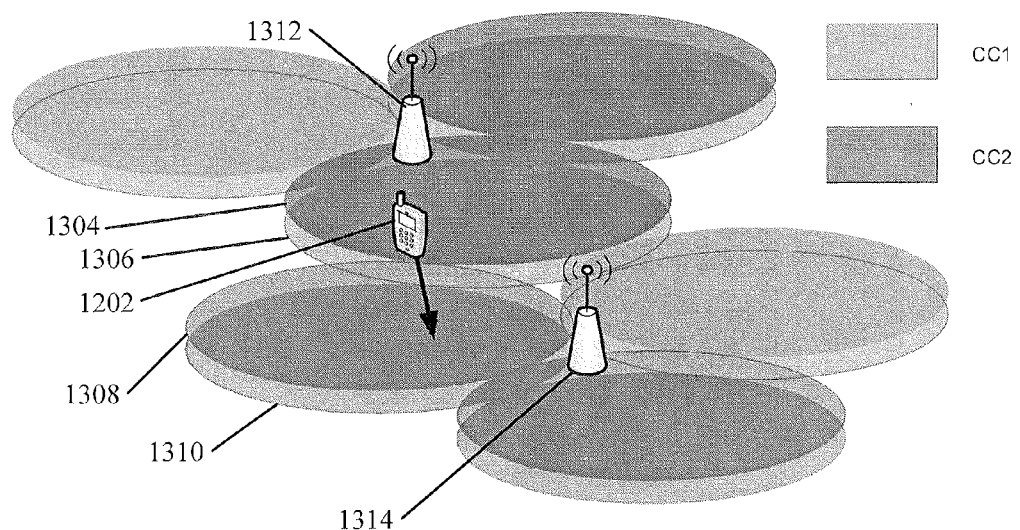
FIGS. 13A and 13B illustrate an example of a UE operating with CA, in accordance with certain aspects of the disclosure.
Figure 13B:
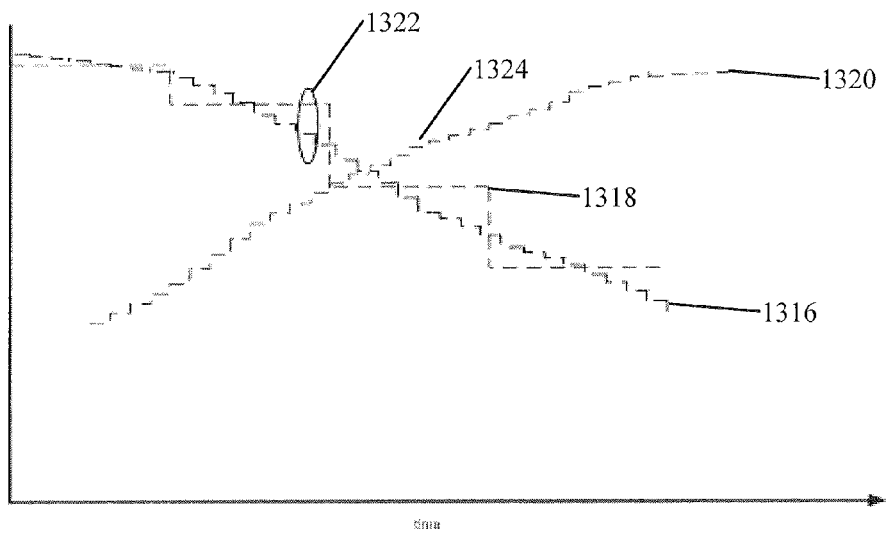

FIGS. 13A and 13B illustrate a second example of a UE operating with CA performing a handover that is less optimal than a handover the UE would perform if operating on only a single carrier. In the example, UE 1202 is moving out of the UE's PCell and SCell coverage areas 1304 and 1306, into PCell and SCell coverage areas 1308 and 1310. In the example, the SCell is deactivated for the UE. Also in the example, because the SCell is deactivated, the UE measures the SCell less often than the UE measures the PCell. Because the UE is moving away from the base station 1312 in the example, the signal strengths of the PCell and the SCell are both decreasing. However, because the UE is measuring the SCell less often than the PCell, the UE determines that the PCell's signal strength has decreased more often than the UE determines that the SCell's signal strength has decreased, as illustrated by the graph in FIG. 13B. The stepped dashed line 1316 represents the measurements of the PCell, while the stepped dashed line 1318 represents the measurements of the SCell. The stepped dashed line 1320 represents the measurements on the PCC of the base station 1314. In the example, the UE is commanded to handover from the PCell to the SCell when the SCell's signal strength, as measured by the UE, exceeds the signal strength of the PCell, as measured by the UE, by a threshold amount. The solid ellipse 1322 indicates when this occurs. In the example, the signal strength of the SCell and PCell should closely approximate each other, but, because the UE is measuring the SCell less often than the PCell, the UE determines that the SCell's signal strength is higher and the UE is commanded to handover to the SCell. In the example, the UE should be commanded to handover to base station 1314 at approximately the time indicated by callout number 1324. However, this handover may be delayed until the expiration of a handover timer that was triggered by the handover to the SCell at 1322. A handover timer is known in the field of wireless communications and is common to LTE systems to prevent a UE traveling near cell boundaries from rapidly handing over, or "ping-ponging," between two cells.

Figure 14A:
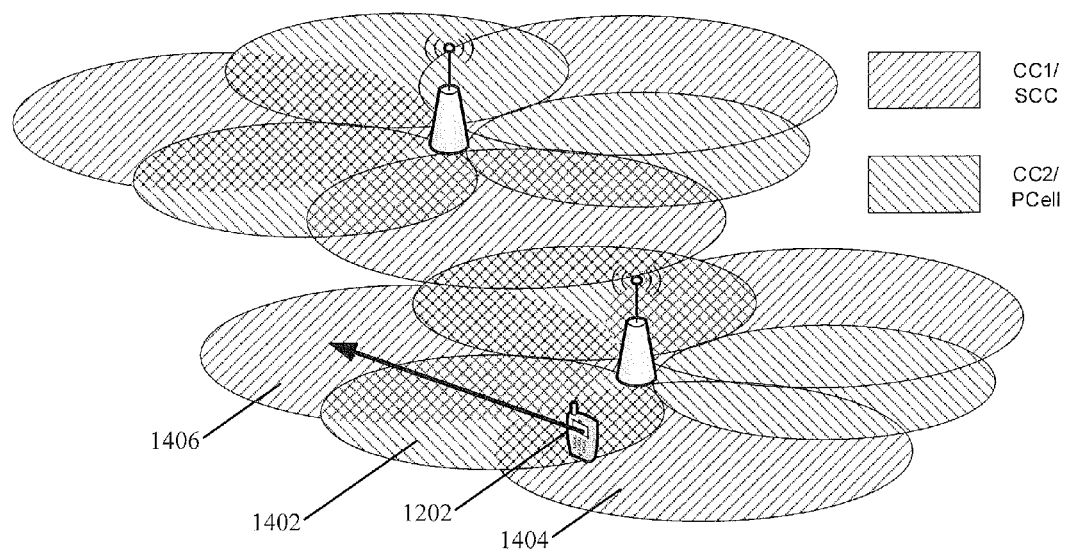
FIGS. 14A and 14B illustrate an example of a UE operating with CA, in accordance with certain aspects of the disclosure.
Figure 14B:
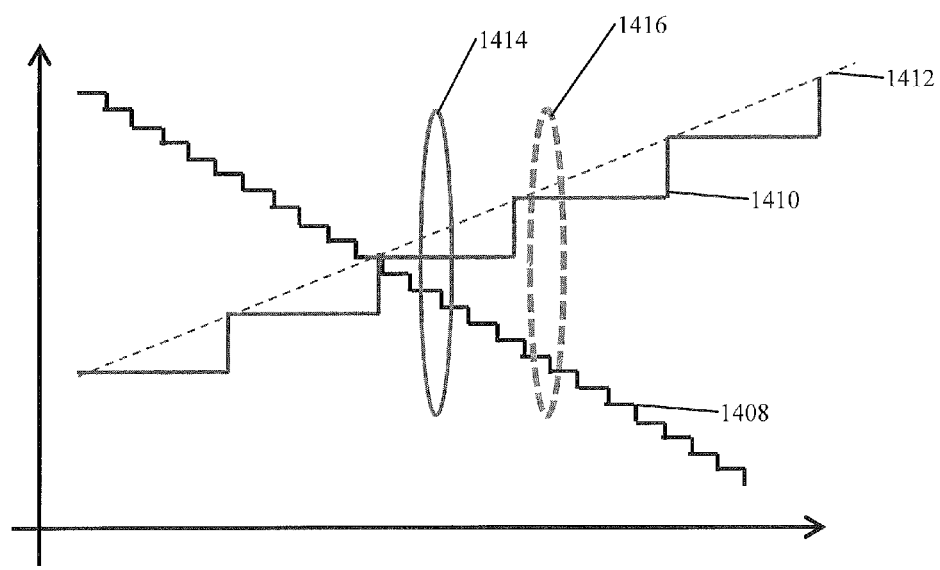

FIGS. 14A and 14B illustrate a third example of a UE operating with CA performing a handover that is less optimal than a handover the UE would perform if operating on only a single carrier. In the example, UE 1202 is configured to use the cell with coverage area 1402 as the UE's PCell, and the cell with coverage area 1404 as the UE's SCell. In the example, the UE is moving outside of the PCell coverage area and does not swap to using the cell with coverage area 1406 as the UE's SCell. In the example, the SCell is deactivated for the UE. Also in the example, because the SCell is deactivated, the UE measures on the SCC less often than the UE measures the PCell. Because the UE is measuring on the SCC less often than the PCell, the UE determines that the PCell's signal strength has decreased more often than the UE determines that the signal strength of the cell with coverage area 1406 has increased, as illustrated by the graph in FIG. 14B. The stepped line 1408 represents the measurements of the PCell, while the stepped line 1410 represents the measurements of the cell with coverage area 1406. The dashed line 1412 represents the actual power level of the cell with coverage area 1406 received at the UE. In the example, the UE is commanded to handover from the PCell to the SCell when the SCell's signal strength exceeds the signal strength of the PCell by a threshold amount. The solid ellipse 1414 indicates when this should occur, based on the measurement of the PCell and the actual signal strength of the cell with coverage area 1406. In the example, the handover is triggered at the dashed ellipse 1416, because the UE measures the PCell's decreasing signal strength more often than the UE measures the increasing signal strength of the cell with coverage area 1406.

According to certain aspects of the present disclosure, an SCell or a neighboring cell on the SCC may not be considered by the eNB for handover of the UE from the UE's serving PCell. According to these aspects, a UE may not vary the rate of search and measurement on an SCC if the UE determines that the SCC is not going to be considered for handover. According to these aspects, a UE may determine that an SCC should not be considered for handover by determining if the SCC is not configured with a measurement object or certain measurement events. For example, a UE may be operating in a CA system and determine that neither measurement event A3 nor A5 is configured on an SCC. In the example, the UE may determine that the SCC is not going to be considered for handover and the UE may determine to not vary the rate of search and measurement of the SCC, based on measurement event A3 or A5 not being configured on the SCC. Although measurement events A2 and A3 are described above, other measurements may be employed as well, such as A5. In aspects, measurement events may include 3GPP Rel. 10 Measurement Events A2, A3, and/or A5.

Figure 15:
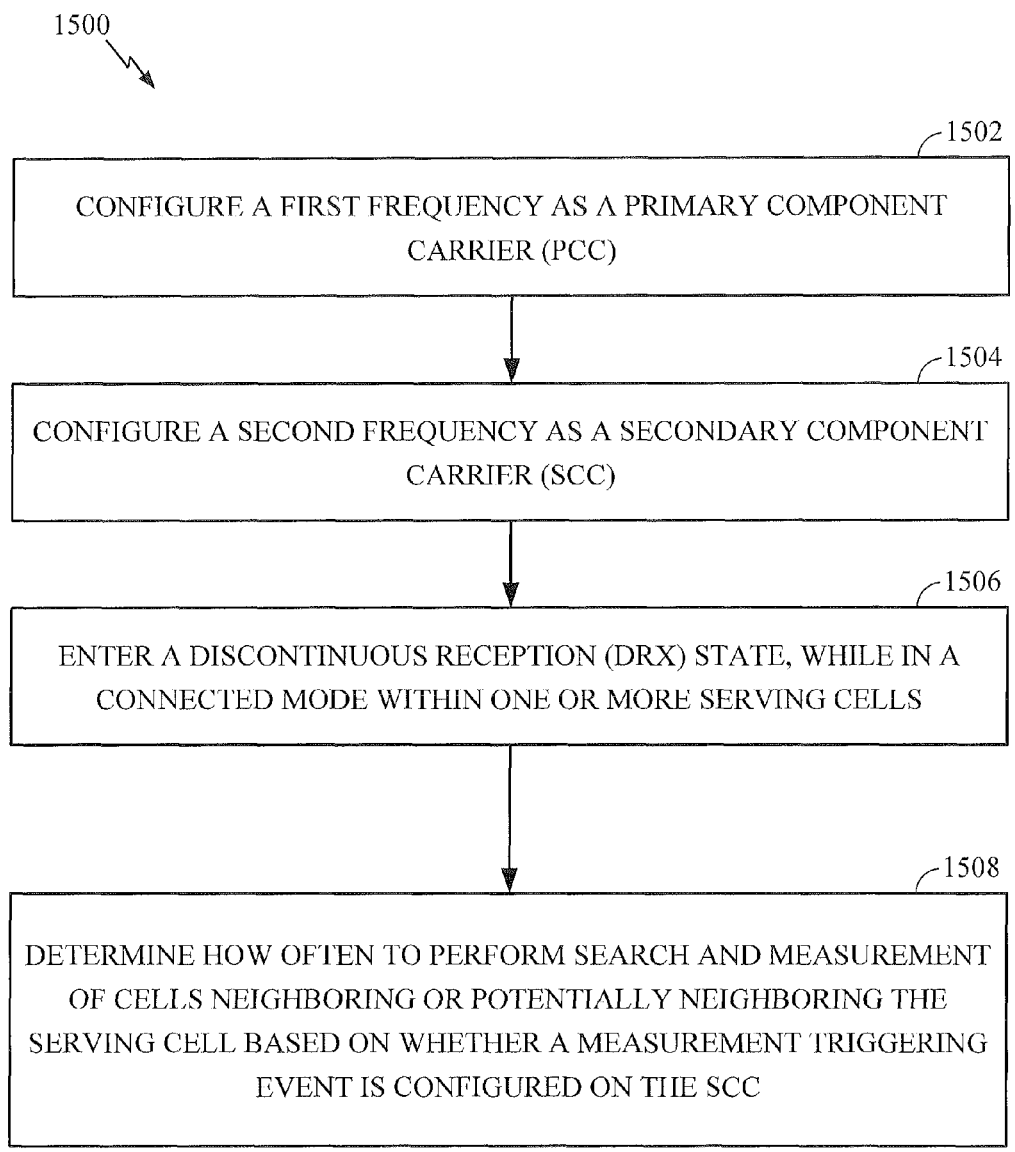
FIG. 15 illustrates example operations 1500 for wireless communications performed, for example, by a UE, in accordance with certain aspects of the disclosure.

FIG. 15 illustrates example operations 1500 for wireless communications performed, for example, by a UE, such as UE 206. At 1502, the UE may configure a first frequency as a primary component carrier (PCC). For example, a UE may configure a 20 MHz band at a center frequency of 5.4 GHz as a PCC. At 1504, the UE may configure a second frequency as a secondary component carrier (SCC). In the example, the UE may configure a 20 MHz band at a center frequency of 5.42 GHz as an SCC. In aspects, a plurality of SCCs may be configured (e.g. up to four SCCs). At 1506, the UE may enter a discontinuous reception (DRX) state, while in a connected mode (e.g., RRC connected mode) within one or more serving cells. In the example, the UE may enter a DRX state while connected to a first cell on the PCC and a second cell on the SCC. At 1508, the UE may determine how often to perform search and measurement of cells neighboring or potentially neighboring the one or more serving cells based on whether a measurement triggering event is configured on the SCC. In the example, the UE may determine that measuring event A3 or A5 is not configured on the SCC, and determine to search for and measure neighboring and potentially neighboring cells on the SCC at a minimum rate, based on determining that measuring event A3 or A5 is not configured on the SCC. In aspects, a UE can have one or more serving cells (PCell and one or more SCells). Each cell is on a frequency. Thus, there is a PCC and one or more SCCs. Each serving frequency (PCC or SCCs) can have multiple cells, one serving cell on each frequency, and potentially one or more neighbors on that frequency.

According to certain aspects of the present disclosure, a UE may perform search and measurement on the second frequency as often as indicated by the determination. For example, a UE operating in a CA system, configured with a PCC and one or more SCCs, may determine to increase the rate of search and measurement of neighbor cells on the PCC, while also determining to continue searching and measurement of neighbor cells on the one or more SCCs at a minimal rate that is different from the rate of search and measurement of neighbor cells on the PCC.

According to certain aspects, a UE may determine to perform search and measurement on the second frequency further based on whether an SCell is activated on the SCC. For example, a UE operating in a CA system, configured with a PCC and an SCC, may determine that an SCell is activated on the SCC, and the UE may determine to increase or decrease the rate of search and measurement of neighbor cells on the SCC, based on the serving cell being activated on the SCC.

According to certain aspects, a UE may determine to perform search and measurement on the second frequency further based on one or more factors indicative of at least one of signal quality metrics of the cells on the primary serving frequency or signal quality metrics on the primary serving frequency relative to the signal quality metrics of one or more secondary serving cells neighboring or potentially neighboring cells on the one or more serving component carriers. That is, the UE may determine how often to perform cell search and measurement on the second serving frequency based on a comparison of signal quality of the PCell with signal quality of a neighboring cell on PCC or a cell on the SCC. For example, a UE operating in a CA system, configured with a PCell and an SCell, may determine to increase the rate of search and measurement on the second serving frequency, based on the signal strength of the neighbors on the SCC being higher than signal strength of the PCell or neighbor cells on the PCC.

According to certain aspects, the one or more factors comprise at least one of: a metric related to reception of a reference signal of the one or more serving cells, a signal to noise ratio (SNR) of one or more serving cells, satisfaction of conditions to enter a measurement event on the PCC or SCC, or an occurrence of a decoding failure of a downlink (DL) channel on the PCell. For example, a UE may determine to increase the rate of search and measurement of neighbor cells on the second frequency based on RSRP of the serving cell on the primary frequency decreasing below a threshold.

According to certain aspects, the determining comprises determining whether the UE is in one of a plurality of states, based on the one or more factors; and each state has a corresponding periodicity for performing search on the second frequency of cells neighboring or potentially neighboring the serving cell and a corresponding periodicity for performing measurement on the second frequency of cells neighboring or potentially neighboring the one or more serving cells. In aspects, such periodicities may be different than those periodicities associated with a UE configuration provided by the network, for example.

According to certain aspects, the plurality of states comprises at least a first, second, and third state; and periodicities for performing search and/or measurement of cells neighboring or potentially neighboring the serving cell on the second frequency for each of the first, second, and third states are such that searches and/or measurements on the second frequency are performed more often for the second state than for the first state and more often for the third state than for the second state.

According to certain aspects, determining whether the UE is in one of a plurality of states, based on the one or more factors, includes determining the UE is in the third state if at least one of: a metric related to reception of a reference signal of the serving cell on the first frequency is less than a first threshold value, a signal to noise ratio (SNR) on the first frequency of the serving cell is less than a second threshold value, satisfaction of conditions to enter a first measurement event occurs, or a decoding failure of a downlink (DL) channel on the PCell in the one or more serving cells occurs. For example, a UE may determine to transition to or remain in the third state if RSRQ of the PCell drops below a first threshold value.

According to certain aspects, determining whether the UE is in one of a plurality of states, based on the one or more factors, further comprises determining the UE is in the second state if at least one of: the metric related to reception of the reference signal of the PCell is less than a third threshold value, the SNR of the PCell is less than a fourth threshold value, or satisfaction of conditions to enter a second measurement event occurs. For example, a UE may determine to transition to or remain in the second state if RSRQ of the PCell drops below a third threshold value.

According to certain aspects, determining whether the UE is in one of a plurality of states, based on the one or more factors, further comprises determining the UE is in the first state if the UE is not determined to be in either the second or third states.

According to certain aspects, a UE may determine how often to perform search and measurements on the second frequency based on a metric related to reception of a reference signal of the one or more SCells, a signal to noise ratio (SNR) of the one or more SCells, or satisfaction of conditions to enter a measurement event triggered by an SCell or a neighbor cell on the SCC. For example, a UE operating in a CA system may determine that signal strength of an SCell is below a second threshold, and the UE may determine to increase the rate of measurement of the SCC to a maximum rate.

According to certain aspects, the determining comprises determining whether the UE is in one of a plurality of states, based on the one or more factors; and each state has a corresponding periodicity for performing search on the second frequency of cells neighboring or potentially neighboring the serving cell and a corresponding periodicity for performing measurement on the second frequency of cells neighboring or potentially neighboring the one or more serving cells. In aspects, such periodicities may be different than those periodicities associated with a UE configuration provided by the network, for example.

According to certain aspects, the plurality of states comprises at least a first and second state; and periodicities for performing search and/or measurement on the second frequency of cells neighboring or potentially neighboring the serving cell for each of the first and second states are such that search and/or measurements are performed more often for the second state than for the first state. For example, periodicities of a first state may be per the maximum periodicities (i.e., minimum rates) listed in Section 8.3 from 3GPP TS 36.133, while periodicities of a second state may be defined to be half of the periodicities (i.e., double the rates) of the first state.

According to certain aspects, determining whether the UE is in one of a plurality of states, based on the one or more factors, further comprises determining the UE is in the second state if at least one of: the metric related to reception of the reference signal of the one PCell is less than a first threshold value, the SNR of the PCell is less than a second threshold value, or satisfaction of entrance conditions of a first measurement event occurs; and at least one of: the metric related to reception of a reference signal of one or more SCells is less than a third threshold value, the signal to noise ratio (SNR) of the one or more SCells is less than a fourth threshold value, or satisfaction of entrance conditions of a second measurement event triggered by an SCell or a neighbor cell on the SCC. For example, a UE may determine to transition to or remain in the second state if RSRQ of the PCell drops below a first threshold value and RSRQ one or more SCells drops below a third threshold.

According to certain aspects, determining whether the UE is in one of a plurality of states, based on the one or more factors, further comprises determining the UE is in the first state if the UE is not determined to be in the second state.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a user equipment (UE), comprising:
   entering a discontinuous reception (DRX) state, while in a connected mode within a serving cell; and
   determining how often to perform search and measurement of cells neighboring or potentially neighboring the serving cell based on one or more factors indicative of at least signal quality, relative to the serving cell, in a cell neighboring or potentially neighboring the serving cell, wherein:
      the one or more factors comprise an occurrence of a decoding failure of a downlink (DL) channel in the serving cell;
      the determining comprises determining whether the UE is in one of a plurality of states comprising at least a first state, a second state, and a third state, based on the one or more factors;
      each state of the plurality of states has a corresponding periodicity for performing search of cells neighboring or potentially neighboring the serving cell and a corresponding periodicity for performing measurement of cells neighboring or potentially neighboring the serving cell; and
      periodicities for performing search and measurement of cells neighboring or potentially neighboring the serving cell for each of the first state, the second state, and the third state are such that searches and measurements are performed more often for the second state than for the first state and more often for the third state than for the second state.

2. The method of claim 1, further comprising performing search and measurement of cells neighboring or potentially neighboring the serving cell as often as determined.

3. The method of claim 1, wherein periodicities of the first state correspond to minimum defined requirements for how often to perform search and measurement of cells neighboring or potentially neighboring the serving cell.

4. The method of claim 1, wherein determining whether the UE is in one of a plurality of states, based on the one or more factors, comprises:
   determining the UE is in the third state if at least one of: a metric related to reception of a reference signal of the serving cell is less than a first threshold value, a signal to noise ratio (SNR) of the serving cell is less than a second threshold value, satisfaction of conditions to enter a first measurement event occurs, or the decoding failure of the downlink (DL) channel in the serving cell occurs.

5. The method of claim 4, wherein determining whether the UE is in one of a plurality of states, based on the one or more factors, further comprises:
   determining the UE is in the second state if at least one of: the metric related to reception of the reference signal of the serving cell is less than a third threshold value, the SNR of the serving cell is less than a fourth threshold value, or satisfaction of conditions to enter a second measurement event occurs.

6. The method of claim 5, wherein determining whether the UE is in one of a plurality of states, based on the one or more factors, further comprises:
   determining the UE is in the first state if the UE is not determined to be in either the second or third states.

7. A method for wireless communications by a user equipment (UE), comprising:
   configuring a first serving frequency as a primary component carrier (PCC);
   configuring a second serving frequency as a secondary component carrier (SCC);
   entering a discontinuous reception (DRX) state, while in a connected mode within one or more serving cells; and
   determining how often to perform search and measurement on the second serving frequency of cells neighboring or potentially neighboring the one or more serving cells based on whether a measurement event is configured on the SCC, wherein:
      the determining comprises determining whether the UE is in one of a plurality of states comprising at least a first state, a second state, and a third state:
      each state of the plurality of states has a corresponding periodicity for performing search on the second serving frequency of cells neighboring or potentially neighboring the one or more serving cells and a corresponding periodicity for performing measurement on the second serving frequency of cells neighboring or potentially neighboring the one or more serving cells; and
      periodicities for performing search and measurement of cells neighboring or potentially neighboring the serving cell for each of the first state, the second state, and the third state are such that searches and measurements are performed more often for the second state than for the first state and more often for the third state than for the second state.

8. The method of claim 7, further comprising performing search and measurement on the second serving frequency of cells neighboring or potentially neighboring the one or more serving cells as often as determined.

9. The method of claim 7, wherein the determining is further based on whether a serving cell is activated on one or more SCCs.

10. The method of claim 9, wherein the determining is further based on one or more factors comprising at least one of:
a metric related to reception on the first serving frequency of a reference signal of a primary cell (PCell), a signal to noise ratio (SNR) of the PCell, satisfaction of conditions to enter a measurement event, or an occurrence of a decoding failure of a downlink (DL) channel on the PCell.

11. The method of claim 7, wherein determining whether the UE is in one of a plurality of states, based on the one or more factors, comprises:
determining the UE is in the third state if at least one of: a metric related to reception on the first serving frequency of a reference signal of the PCell is less than a first threshold value, a signal to noise ratio (SNR) of the PCell is less than a second threshold value, satisfaction of conditions to enter a first measurement event occurs, or a decoding failure of a downlink (DL) channel on the PCell occurs.

12. The method of claim 11, wherein determining whether the UE is in one of a plurality of states, based on the one or more factors, further comprises:
determining the UE is in the second state if at least one of: the metric related to reception of the reference signal on the first serving frequency of the PCell is less than a third threshold value, the SNR of the PCell is less than a fourth threshold value, or satisfaction of conditions to enter a second measurement event occurs.

13. The method of claim 12, wherein determining whether the UE is in one of a plurality of states, based on the one or more factors, further comprises:
determining the UE is in the first state if the UE is not determined to be in either the second or third states.

14. The method of claim 10, wherein:
the one or more factors further comprise at least one of:
a metric related to reception on the first serving frequency of a reference signal of the PCell, a signal to noise ratio (SNR) of the PCell, satisfaction of conditions to enter a first measurement event, or an occurrence of a decoding failure of a downlink (DL) channel on the PCell; and
the one or more factors further comprise at least one of:
a metric related to reception on the second serving frequency of a reference signal of an SCell, a signal to noise ratio (SNR) of an SCell, or satisfaction of conditions to enter a second measurement event.

15. The method of claim 14, wherein determining whether the UE is in one of a plurality of states, based on the one or more factors, further comprises:
determining the UE is in the second state if:
at least one of the metric related to reception of the reference signal of the PCell is less than a first threshold value, the SNR of the PCell is less than a second threshold value, satisfaction of conditions to enter a first measurement event occurs, or a decoding failure of a downlink (DL) channel on the PCell occurs; and
at least one of the metric related to reception on the second serving frequency of a reference signal of an SCell is less than a third threshold value, the signal to noise ratio (SNR) on of an SCell is less than a fourth threshold value, or satisfaction of conditions to enter a second measurement event occurs.

16. An apparatus for wireless communications, comprising:
a processor configured to:
enter a discontinuous reception (DRX) state, while in a connected mode within a serving cell, and
determine how often to perform search and measurement of cells neighboring or potentially neighboring the serving cell based on one or more factors indicative of signal quality, relative to the serving cell, in a cell neighboring or potentially neighboring the serving cell, wherein:
the one or more factors comprise an occurrence of a decoding failure of a downlink (DL) channel in the serving cell;
the determining comprises determining whether the apparatus is in one of a plurality of states comprising at least a first state, a second state, and a third state, based on the one or more factors;
each state has a corresponding periodicity for performing search of cells neighboring or potentially neighboring the serving cell and a corresponding periodicity for performing measurement of cells neighboring or potentially neighboring the serving cell; and
periodicities for performing search and measurement of cells neighboring or potentially neighboring the serving cell for each of the first state, the second state, and the third state are such that searches and measurements are performed more often for the second state than for the first state and more often for the third state than for the second state; and
a memory coupled to the processor.

17. The apparatus of claim 16, wherein the processor is further configured to perform search and measurement of cells neighboring or potentially neighboring the serving cell as often as determined.

18. An apparatus for wireless communications, comprising:
a processor configured to:
configure a first serving frequency as a primary component carrier (PCC),
configure a second serving frequency as a secondary component carrier (SCC),
enter a discontinuous reception (DRX) state, while in a connected mode within one or more serving cells, and
determine how often to perform search and measurement on the second serving frequency of cells neighboring or potentially neighboring the one or more serving cells based on whether a measurement event is configured on the SCC, wherein:
the determining comprises determining whether the UE is in one of a plurality of states comprising at least a first state, a second state, and a third state:
each state of the plurality of states has a corresponding periodicity for performing search on the second serving frequency of cells neighboring or potentially neighboring the one or more serving cells and a corresponding periodicity for performing measurement on the second serving frequency of cells neighboring or potentially neighboring the one or more serving cells; and
periodicities for performing search and measurement of cells neighboring or potentially neighboring the serving cell for each of the first state, the second state, and the third state are such that searches and measurements are performed more often for the second state than for the first state and more often for the third state than for the second state; and a memory coupled to the processor.

19. The apparatus of claim 18, wherein the processor is further configured to perform search and measurement on the second serving frequency of cells neighboring or potentially neighboring the one or more serving cells as often as determined.

20. The method of claim 1, wherein the one or more factors further comprise at least one of:

a metric related to reception of a reference signal of the serving cell, a signal to noise ratio (SNR) of the serving cell, or satisfaction of conditions to enter a measurement event.

\* \* \* \* \*